United States Patent
Dasalukunte et al.

(10) Patent No.: US 12,254,399 B2
(45) Date of Patent: Mar. 18, 2025

(54) HIERARCHICAL HYBRID NETWORK ON CHIP ARCHITECTURE FOR COMPUTE-IN-MEMORY PROBABILISTIC MACHINE LEARNING ACCELERATOR

(71) Applicant: Intel Corporation, Santa Clara, CA (US)

(72) Inventors: Deepak Dasalukunte, Beaverton, OR (US); Richard Dorrance, Hillsboro, OR (US); Hechen Wang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 17/159,312

(22) Filed: Jan. 27, 2021

(65) Prior Publication Data
US 2021/0150328 A1    May 20, 2021

(51) Int. Cl.
  *G06N 3/065*    (2023.01)
  *G06N 3/047*    (2023.01)
  *H04L 45/586*  (2022.01)
  *H04L 49/109*  (2022.01)

(52) U.S. Cl.
  CPC ............. *G06N 3/065* (2023.01); *G06N 3/047* (2023.01); *H04L 45/586* (2013.01); *H04L 49/109* (2013.01)

(58) Field of Classification Search
  CPC ...... G06N 3/065; G06N 3/047; H04L 45/586; H04L 49/109
  USPC ......................................................... 706/26
  See application file for complete search history.

(56) References Cited

U.S. PATENT DOCUMENTS

| | | | |
|---|---|---|---|
| 11,100,193 B2* | 8/2021 | Gu ........................... | G06F 17/16 |
| 11,847,560 B2* | 12/2023 | Kolter ..................... | G06N 3/063 |
| 2018/0095930 A1* | 4/2018 | Lu ........................ | G11C 13/0002 |

OTHER PUBLICATIONS

Carrillo et al., "Scalable Hierarchical Network-on-Chip Architecture for Spiking Neural Network Hardware Implementation", IEEE Transactions on Parallel and Distributed Systems, vol. 24, No. 12, Dec. 2013 (Year: 2013).*
A. D. Patil, H. Hua, S. Gonugondla, M. Kang and N. R. Shanbhag, "An MRAM-Based Deep In-Memory Architecture for Deep Neural Networks," 2019 IEEE International Symposium on Circuits and Systems (ISCAS), 2019, pp. 1-5, doi: 10.1109/ISCAS.2019.8702206.

(Continued)

*Primary Examiner* — Tsu-Chang Lee
(74) *Attorney, Agent, or Firm* — Hanley, Flight & Zimmerman, LLC

(57) ABSTRACT

Systems, methods, apparatuses, and computer-readable media. An analog router of a first supertile of a plurality of supertiles of a network on a chip (NoC) may receive a first analog output from a first compute-in-memory tile of a plurality of compute-in-memory tiles of the first supertile. The analog router may determine, based on a configuration of a neural network executing on the NoC, that a destination of the first analog output includes a second supertile of the plurality of supertiles. An analog-to-digital converter (ADC) of the analog router may convert the first analog output to a first digital output and transmit the first digital output to the second supertile via a communications bus of the NoC.

17 Claims, 11 Drawing Sheets

(56) References Cited

OTHER PUBLICATIONS

Sebastian et al., "Tutorial: Brain-inspired computing using phase-change memory devices" Journal of Applied Physics 124, 111101 (2018); https://doi.org/10.1063/1.5042413.
D. Miyashita, S. Kousai, T. Suzuki and J. Deguchi, "Time-domain neural network: A 48.5 TSOp/s/W neuromorphic chip optimized for deep learning and CMOS technology," 2016 IEEE Asian Solid-State Circuits Conference (A-SSCC), 2016, pp. 25-28, doi: 10.1109/ASSCC.2016.7844126.
S. K. Gonugondla, M. Kang and N. Shanbhag, "A 42pJ/decision 3.12TOPS/W robust in-memory machine learning classifier with on-chip training," 2018 IEEE International Solid-State Circuits Conference—(ISSCC), 2018, pp. 490-492, doi: 10.1109/ISSCC.2018.8310398.
J. Song, K. Ragab, X. Tang and N. Sun, "A 10-b 800-MS/s Time-Interleaved SAR ADC With Fast Variance-Based Timing-Skew Calibration," in IEEE Journal of Solid-State Circuits, vol. 52, No. 10, pp. 2563-2575, Oct. 2017, doi: 10.1109/JSSC.2017.2713523.
H. Valavi, P. J. Ramadge, E. Nestler and N. Verma, "A 64-Tile 2.4-Mb In-Memory-Computing CNN Accelerator Employing Charge-Domain Compute," in IEEE Journal of Solid-State Circuits, vol. 54, No. 6, pp. 1789-1799, Jun. 2019, doi: 10.1109/JSSC.2019.2899730.
Hopkins Michael, Mikaitis Mantas, Lester Dave R. and Furber Steve 2020Stochastic rounding and reduced-precision fixed-point arithmetic for solving neural ordinary differential equationsPhil. Trans. R. Soc. A.3782019005220190052 http://doi.org/10.1098/rsta.2019.0052.
Gupta et al., "Deep Learning with Limited Numerical Precision." In Proceedings of the 32nd International Conference on Machine Learning—vol. 37 (ICML'15). JMLR.org, 1737-1746.
Author Unknown, "Network on a chip" Wikipedia—accessed Aug. 10, 2020.
Wang, J. et al. "A 28-nm Compute SRAM With Bit-Serial Logic/Arithmetic Operations for Programmable In-Memory Vector Computing." IEEE Journal of Solid-State Circuits 55 (2020): 76-86.
X. Liu et al., "RENO: A high-efficient reconfigurable neuromorphic computing accelerator design," 2015 52nd ACM/EDAC/IEEE Design Automation Conference (DAC), 2015, pp. 1-6, doi: 10.1145/2744769.2744900.
Kang, Mingu et al. "A Multi-Functional In-Memory Inference Processor Using a Standard 6T SRAM Array." IEEE Journal of Solid-State Circuits 53 (2018): 642-655.
Dong, Qing et al. "15.3 A 351TOPS/W and 372.4GOPS Compute-in-Memory SRAM Macro in 7nm FinFET CMOS for Machine-Learning Applications." 2020 IEEE International Solid-State Circuits Conference—(ISSCC) (2020): 242-244.
"Goya™" Habana—An Intel Company—accessed Aug. 10, 2020.
"Mythic" https://www.mythic-ai.com/technology/—accessed Aug. 10, 2020.
"MNIST database"—Wikipedia—accessed Aug. 10, 2020.

* cited by examiner

HIERARCHICAL HYBRID NETWORK ON CHIP ARCHITECTURE FOR COMPUTE-IN-MEMORY PROBABILISTIC MACHINE LEARNING ACCELERATOR

TECHNICAL FIELD

Embodiments disclosed herein relate to computing apparatuses. More specifically, embodiments disclosed herein relate to hierarchical hybrid network-on-chip architectures for compute-in-memory probabilistic machine learning accelerators.

BACKGROUND

Modern optimizations to compute fabrics in neural networks have addressed many issues. However, memory accesses remain a major contributor to energy consumption by the neural networks. As neural networks become larger, even more energy is required to move data during processing by the neural networks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
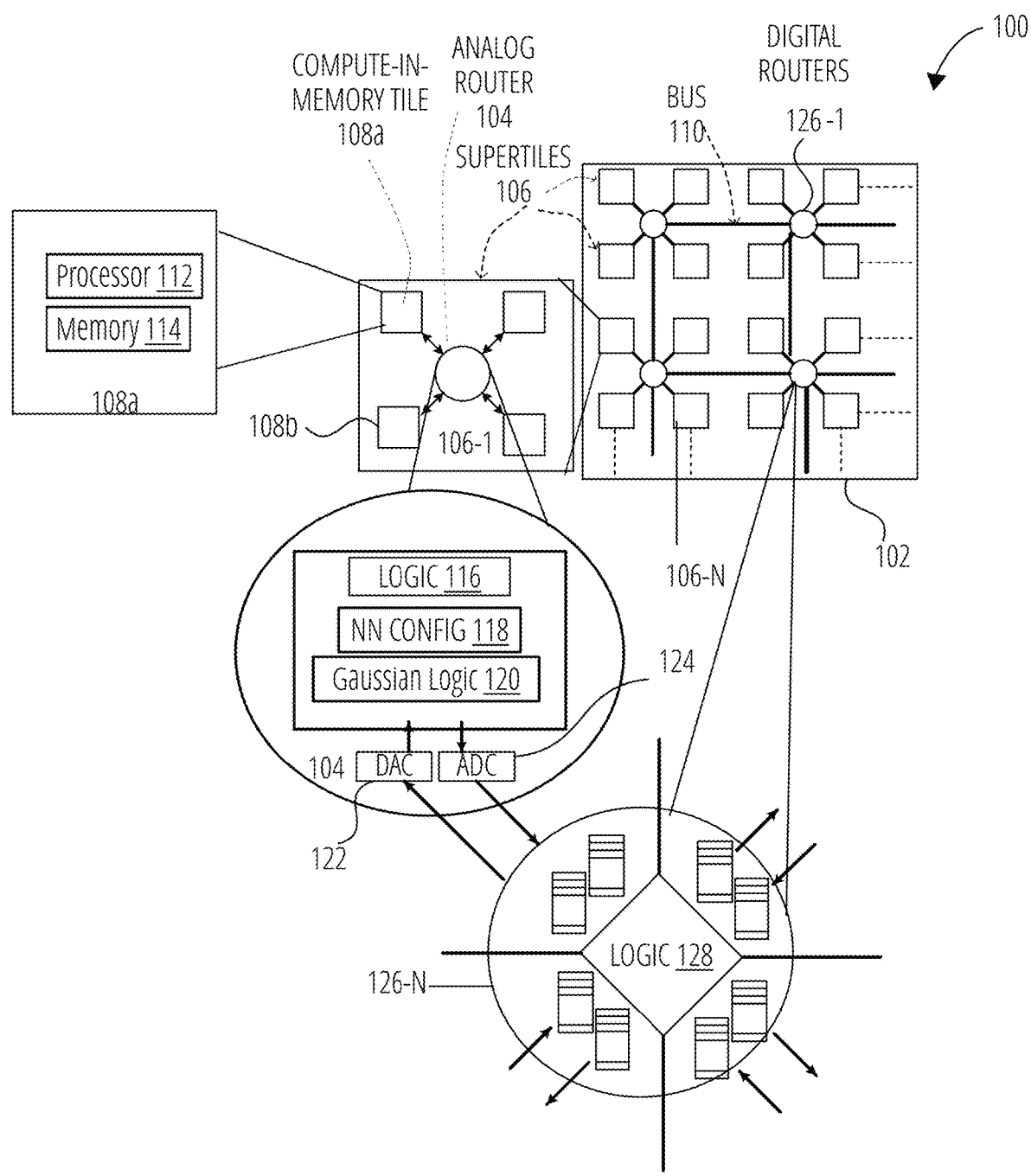
FIG. 1 illustrates an embodiment of a system for hierarchical hybrid network-on-chip architectures for compute-in-memory probabilistic machine learning accelerators.

Embodiments disclosed herein provide a balanced approach between fully analog or fully digital implementations for networks-on-chip (NoCs) that execute neural networks by providing power savings due to fewer data conversions with the use of an analog router and flexibility and scalability of a digital NoC at the higher level. The disclosure may include a Gaussian distribution circuit embedded in the analog router for supporting probabilistic machine learning applications. In addition, the introduction of stochastic rounding in the analog router provides higher accuracy in reduced precision neural networks as well as providing faster training, lesser training errors, and overfitting.

Furthermore, the analog router fuses well with analog compute-in-memory (CiM) tiles and reduces data conversions between the tiles, resulting in lower-power designs relative to conventional solutions. At the higher level, the NoC provides the flexibility of a digital implementation with packet switched network for data movement to nodes farther away where analog solutions tend to underperform, as loss may occur when transmitting analog signals over distances. Doing so may generally improve system performance by reducing the amount of time and/or energy required to perform analog-to-digital conversions and digital-to-analog conversions. Furthermore, by providing a configurable neural network architecture, the NoC is adaptable to any type of neural network implementations. More generally, by reducing the number of analog/digital conversions, energy and system resources are conserved, which improves the time and amount of resources required to train neural networks and/or perform inference operations using the neural networks.

With general reference to notations and nomenclature used herein, one or more portions of the detailed description which follows may be presented in terms of program procedures executed on a computer or network of computers. These procedural descriptions and representations are used by those skilled in the art to effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1 illustrates a system 100 for hierarchical hybrid network on a chip architecture for compute-in-memory probabilistic machine learning accelerators, according to one embodiment. As shown, the system 100 comprises a network on a chip 102. The NoC 102 may be any suitable logic for training a neural network and/or executing a trained neural network, e.g., to perform runtime (or inference) operations. For example, the NoC 102 may be implemented as a deep learning accelerator card, a processor with deep learning acceleration, a neural compute stick, a System on a Chip (SoC), a printed circuit board, or a chip package with two or more discrete components. Embodiments are not limited in these contexts.

As shown, the network on a chip 102 includes a plurality supertiles 106-1 through 106-N coupled via a digital communications bus 110. The bus 110 may include a plurality of digital routers 126-1 through 126-N to facilitate digital packet switching, transmission, arbitration, and other communication operations for the network on a chip 102. The bus 110 and digital routers 126 may generally form the digital backbone of the supertiles 106, while the supertiles 106 operate in the analog domain. Although depicted as a mesh configuration, the bus 110 may be implemented according to other topologies, such as a tree-based topology, and the like. As shown in supertile 106-1, each supertile 106 includes an analog router 104 and a plurality of compute-in-memory tiles 108. Therefore, four analog routers 104, one from each supertile 106, may interface with a given digital router 126 of the NoC 102.

Generally, each of the compute-in-memory tiles 108 is configured to perform compute-in-memory operations in the analog domain using a processor 112 and a memory 114. The processors 112 are representative of any type of processing circuitry, and the memory 114 is representative of any type of information storage technology, including volatile technologies requiring the uninterrupted provision of electric power, and including technologies entailing the use of machine-readable storage media that may or may not be removable. In at least one embodiment, the processor 112 includes logic to perform multiply-accumulate (MAC) operations or other computations for a neural network. A MAC operation may generally compute the product of two numbers and add the product to an accumulator. Illustratively, each supertile 106 includes four compute-in-memory tiles 108, but any number of compute-in-memory tiles may be included in a given supertile 106.

The analog router 104 includes logic 116 which is generally configured to facilitate information exchange between the compute-in-memory tiles 108 of the supertile 106 and/or the compute-in-memory tiles 108 of other supertiles 106. The logic 116 is representative of any type of processing circuitry. The analog router 104 may further include a neural network configuration 118, a Gaussian logic circuit 120, one or more analog-to-digital converters (ADCs) 122, and one or more digital-to-analog converters (DACs) 120. The neural network configuration 118 includes all parameters to implement a neural network on the NoC 102. For example, the neural network configuration 118 may specify the number of layers, how the layers of the neural network are connected, weights of each node in the neural network, and the like. Example neural networks include, but are not limited to, Deep Neural Networks (DNNs) such as convolutional neural networks (CNNs), recurrent neural networks (RNNs), and the like. A neural network generally implements dynamic programing to determine and solve for an approximated value function. A neural network is formed of a cascade of multiple layers of nonlinear processing units for feature extraction and transformation. Generally, each successive layer of a neural network uses the output from the previous layer as input. A neural network may generally include an input layer, an output layer, and multiple hidden layers. The hidden layers of a neural network may include convolutional layers, pooling layers, fully connected layers, SoftMax layers, and/or normalization layers. In one embodiment, the plurality of hidden layers comprise three hidden layers (e.g., a count of the hidden layers comprises three hidden layers). Embodiments are not limited in these contexts.

Generally, a neural network includes two processing phases, a training phase and an inference phase. During the training process, a deep learning expert will typically architect the network, establishing the number of layers in the network, the operation performed by each layer, and the connectivity between layers. Many layers have parameters, which may be referred to as weights, that determine exact computation performed by the layer. The objective of the training process is to learn the weights, usually via a stochastic gradient descent-based excursion through the space of weights. Once the training process is complete, inference based on the trained neural network (e.g., image analysis, image and/or video encoding, image and/or video decoding, face detection, character recognition, speech recognition, etc.) typically employs a forward-propagation calculation for input data to generate output data.

The analog router 104 may generally perform conversions between the analog and digital domains (and vice versa) using the DACs 122 and the ADCs 124. Advantageously, however, the analog router 104 may limit the number of conversions based on the neural network configuration 118. Generally, when transmitting data within a supertile 106, the analog router 104 may refrain from converting the data from the analog domain to the digital domain and back to the analog domain. For example, the neural network configuration 118 may specify that the analog output of a compute-in-memory tile 108a of a supertile 106a is to be provided to a compute-in-memory tile 108b of supertile 106a as input. Therefore, based on the neural network configuration 118, the analog router 104 may refrain from converting the analog output to digital, and instead directly provide the analog signal to the compute-in-memory tile 108b of the supertile 106a for processing.

However, if the data is to be transmitted between different supertiles 106, the ADC 124 of the transmitting supertile 106 may convert the analog data to the digital domain (e.g., by packetizing the analog data into one or more data packets), and the receiving analog router 104 may convert the digital signal (e.g., one or more data packets) into an analog signal using the DAC 122. The digital routers 126 may generally facilitate the transfer of the packets between supertiles 106 of the network on a chip 102 using the digital router logic 128. In some embodiments, the digital router logic 128 includes the neural network configuration 118, which may be used by the digital router logic 128 to route packets via the bus 110. Doing so facilitates a flexible configuration whereby different configurations of neural networks can be processed by the NoC 102.

Advantageously, the analog routers 104 provide energy savings on the network on a chip 102 by avoiding data conversion overhead within a supertile 106, while the digital routers 126 facilitate flexible and scalable solutions, as described in greater detail herein. Doing so improves the performance of the network on a chip 102 by requiring less energy to power the network on a chip 102 relative to a network on a chip 102 that performs analog to digital conversions (and vice versa) in all scenarios. Furthermore, because analog signals are more vulnerable to interference during transmission, e.g., path loss, noise coupling, and ambient environment variations may significantly impact the fidelity of the analog signal. Interference shields and signal strength boosters may assist, but consume on-chip area and energy. Advantageously, by limiting the transmission of analog signals to within a supertile 106, interference shields and signal strength boosters may be omitted from the configuration of the network on a chip 102.

The Gaussian logic 120 is circuitry embedded in the analog router 104 for supporting probabilistic machine learning applications. Generally, the Gaussian logic 120 may convert the inputs, outputs, and/or weights of a deterministic neural network into a Bayesian neural network by including a programmable noise source. For example, a neuron (also referred to as a node) of a neural network may produce a value as output. However, in probabilistic settings, a distribution, or range of a plurality of values, may be desired. Therefore, the Gaussian logic 120 may generally generate the distribution of values, which may include a mean value and a variance (and/or standard deviation). The distribution may comprise a Gaussian (or normal) probability distribution. Advantageously, the Gaussian logic 120 performs the computations in the analog domain, which is more efficient than the digital domain. The Gaussian logic 120 may introduce scaled Gaussian noise in one or more of: the inputs to the neural network, the weights of the neural network, and/or the outputs of a layer of the neural network as they pass through an analog router 104. Advantageously, introducing the noise at the output of one layer of the neural network (or the input of a layer of the neural network) may provide the solution having the highest throughput and least energy use requirements.

Furthermore, the Gaussian logic 120 may be configured to perform stochastic rounding operations in the analog domain. For example, the stochastic rounding operation may occur between layers of the neural network. Stochastic rounding operations may result in higher accuracy in reduced-precision neural networks, which may be akin to increasing the bit width of the neural network. Furthermore, when used in backpropagation operations in neural network training, stochastic rounding results in faster training of the neural network, lower training error, and less problems of overfitting the training dataset. Performing the stochastic rounding operation in the analog domain incurs almost no overhead in the analog router 104, and less overhead than performing stochastic rounding operations in the digital domain. Advantageously, providing the Gaussian logic 120 in the analog router 104 obviates the need to include an instance of the Gaussian logic 120 in each compute-in-memory tile 108.

Figure 2A:
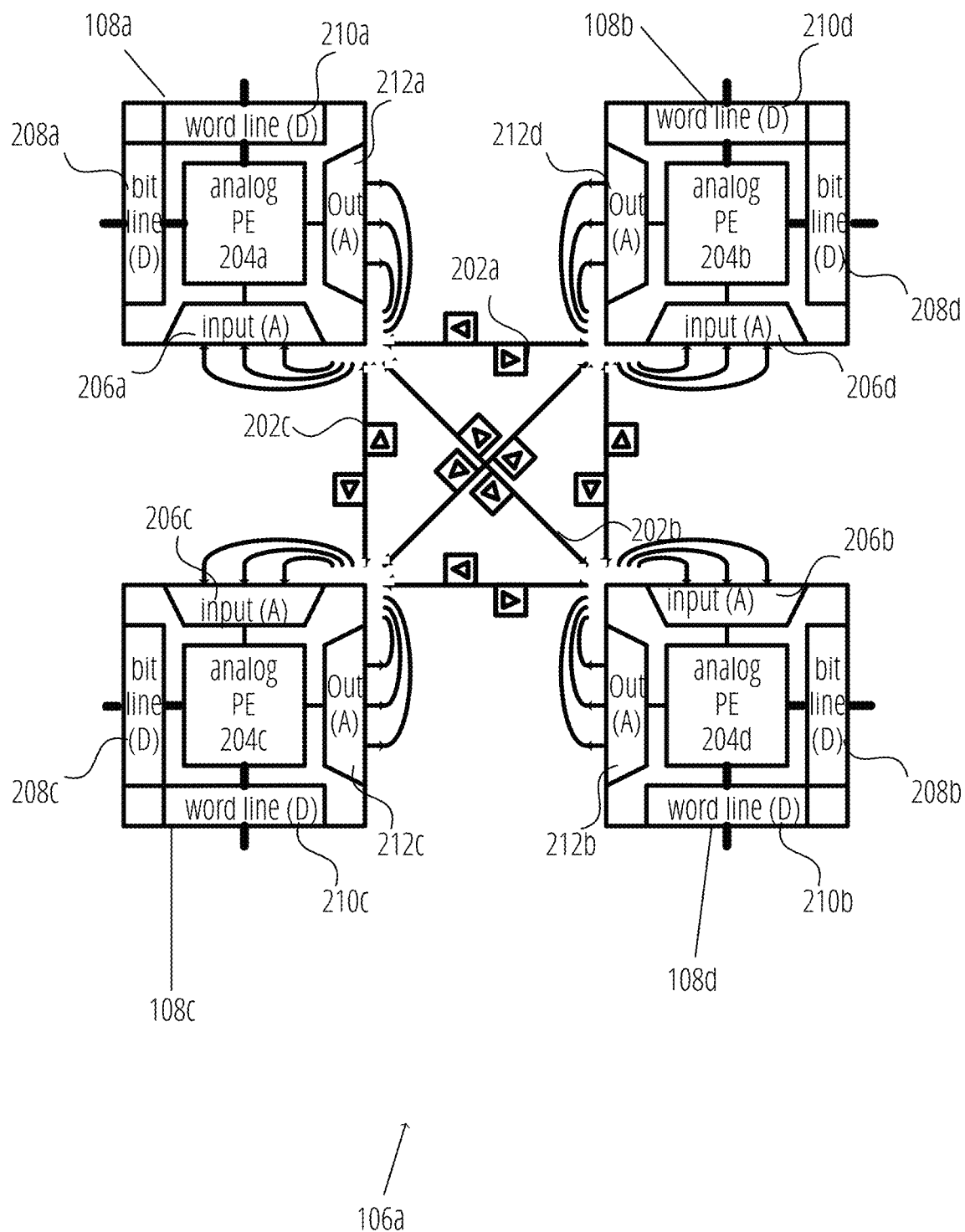
FIGS. 2A-2D illustrate embodiments of hierarchical hybrid network-on-chip architectures for compute-in-memory probabilistic machine learning accelerators.

FIG. 2A illustrates a portion of a supertile 106a, according to one embodiment. As shown, the supertile 106a includes four compute-in-memory tiles 108a-108d coupled by example connections 202a-202c (among other connections not labeled for the sake of clarity). As shown, the compute-in-memory tiles 108a-108d includes analog processing element (PE) 204a-d, an analog input 206a-d, a digital bit line 208a-d, a word line 210a-d, and analog output 212a-d. Generally, in FIGS. 2A-2D, a (D) indicates a hardware element that processes and/or stores data in the digital domain, while an (A) indicates a hardware element that processes and/or stores data in the analog domain. The analog PEs 204a-d may be representative of the processor 112 and memory 114 of FIG. 1.

The connections 202 may generally be selected based on the neural network configuration 118, e.g., the topology of the neural network. Furthermore, the neural network configuration 118 may specify that the output 212a-d should be provided as input to another supertile 106. As stated, the analog routers 104 (not explicitly labeled in FIGS. 2A-2D for clarity) may not convert analog output 212a-d to digital when transmitting data within the supertile 106. For example, if the output (A) 212c is to be provided to input (A) 206d, the logic 116 of the analog router 104 may refrain from converting the output (A) 212c to digital packets. However, if the output (A) 212c is to be transmitted to a different supertile 106b, the analog router 104 may convert the analog output 212c to one or more packets using the ADC 124, and transmit the packets to supertile 106b via the one or more digital routers 126 of the bus 110. The receiving supertile 106b may use the DAC 122 to convert the packets to one or more analog signals for processing by the compute-in-memory tiles 108 of supertile 106b.

Figure 2B:
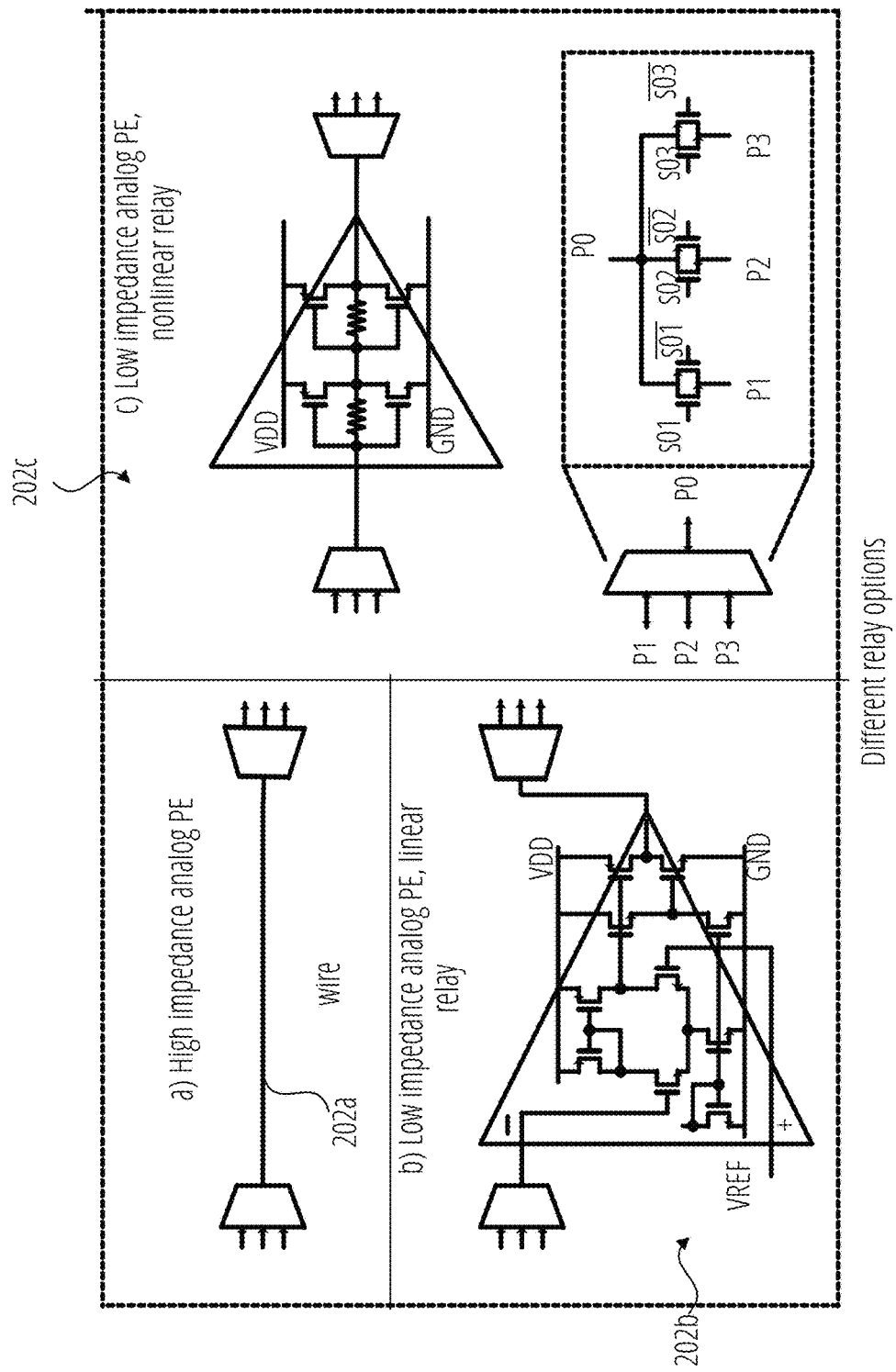

FIG. 2B depicts different example connections 202a-202c, according to various embodiments. As shown, connection 202a may reflect a scenario where analog signals may experience high impedance at the input of the next stage. In such embodiments, a passive connection, such as a piece of wire, is suitable for transmitting analog signals. If the next stage is low impedance and/or requires driven capabilities, the connection may include an active signal relay. The relay may convert the signal with high fidelity (e.g., linearly) or pass the signal with distortion (nonlinear). The connection 202b in FIG. 2B may be a linear relay, while the connection 202c in FIG. 2B may be nonlinear. The connection 202b depicted in FIG. 2B may require more hardware and/or energy consumption relative to the connection 202c. As shown, each connection 202a-c may include one or more multiplexers for signal selection at the input and output of each compute-in-memory tile 108.

Figure 2C:
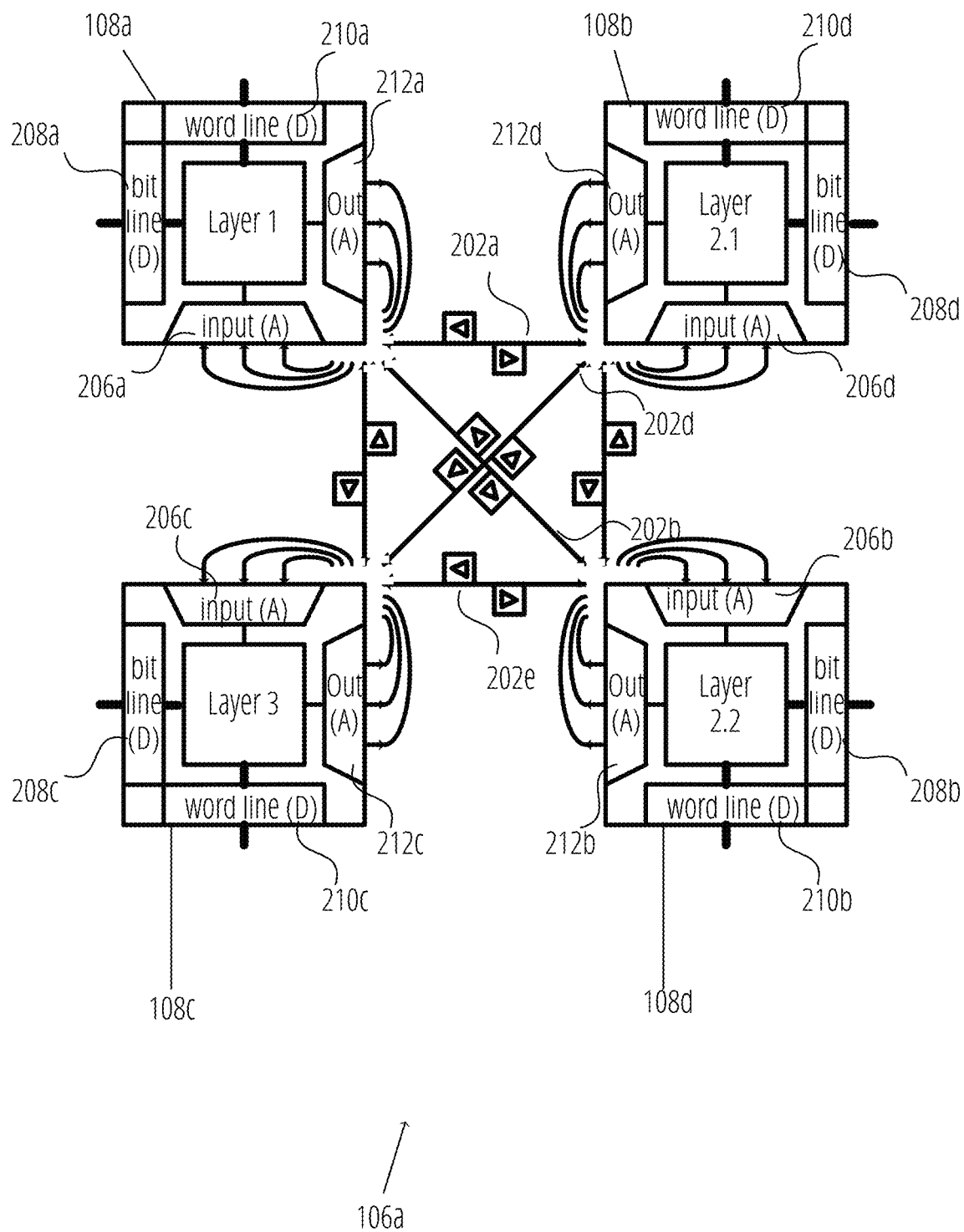

FIG. 2C illustrates an embodiment reflecting an example configuration of a supertile 106 based on a neural network configuration 118. As stated, a neural network may be mapped across the network on a chip 102 based on the neural network configuration 118. A given supertile 106 and the compute-in-memory tiles 108 of the supertile 106 may generally perform one or more tasks of the neural network, with other supertiles 106 and corresponding compute-in-memory tiles 108 performing other tasks for the neural network. When multiple layers of a neural network are processed within a single supertile 106, as depicted in FIG. 2C, the computation is distributed across the compute-in-memory tiles 108a-d, and the analog router 104 manages the transfer of data between the compute-in-memory tiles 108a-d, as well as the transfer of data to other supertiles 106.

More specifically, as shown in FIG. 2C, the supertile 106a processes three layers of the neural network, namely layers 1, 2, and 3. However, as shown, layers 1 and 3 are processed by analog PE 204a and analog PE 204c of compute-in-memory tiles 108a and 108c, respectively. Furthermore, layer 2 requires two layers, layers 2.1 and 2.2, which are processed by analog PE 204b and analog PE 204d of compute-in-memory tiles 108b and 108d, respectively. A portion of the analog data outputted by compute-in-memory tile 108a is transmitted to compute-in-memory tile 108b via connection 202a without requiring conversion from analog to digital, and back from digital to analog. Similarly, a portion of the analog output of compute-in-memory tile 108a is transmitted to compute-in-memory tile 108d via connection 202b. Similarly, the analog output of compute-in-memory tile 108b is transmitted to compute-in-memory tile 108c via connection 202d, while the analog output of compute-in-memory tile 108d is transmitted to compute-inmemory tile 108c via connection 202e. Advantageously, all data transmission depicted in FIG. 2C do not require conversion from analog to digital, and back from digital to analog.

Figure 2D:
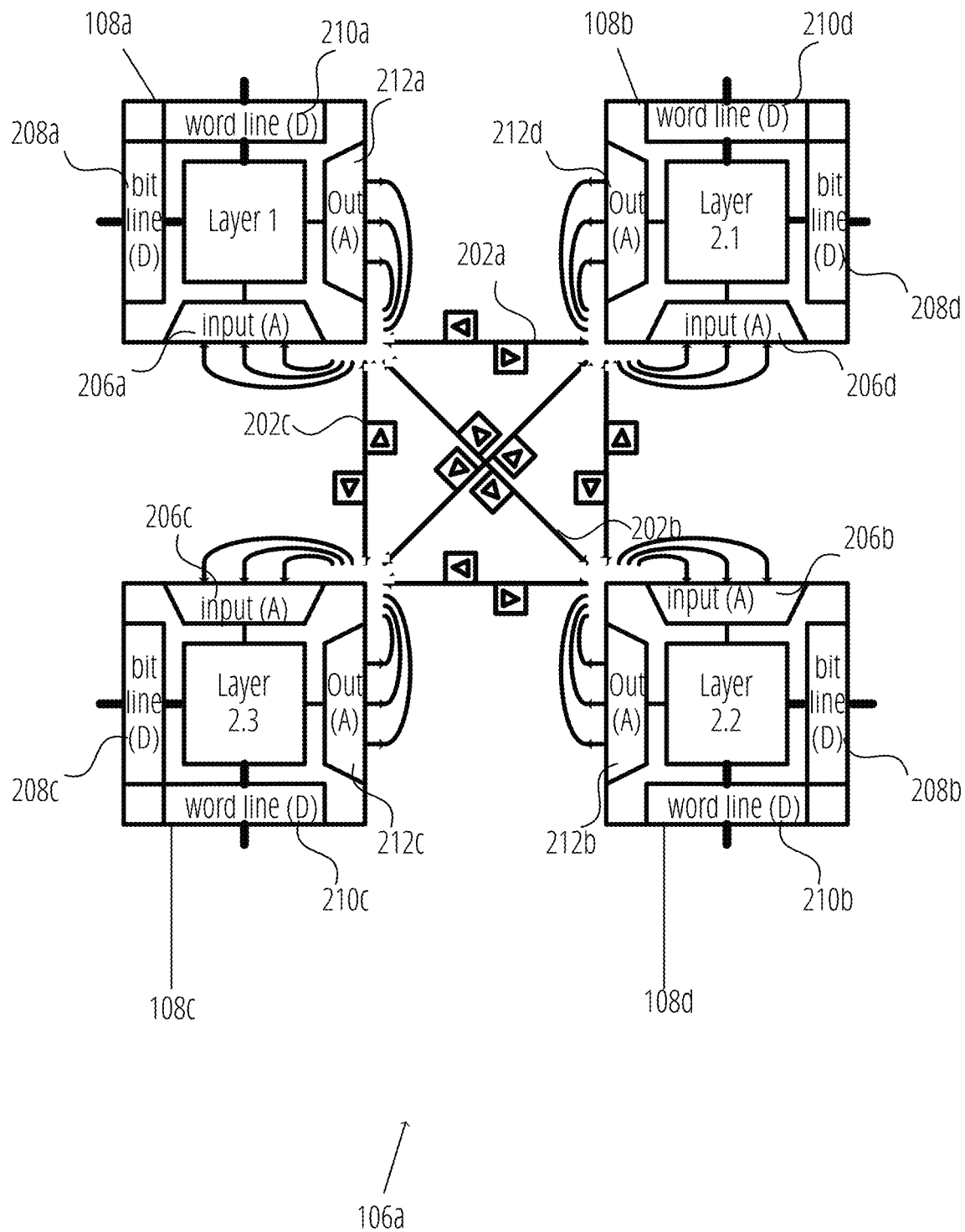

FIG. 2D depicts an example configuration of a supertile 106 based on a neural network configuration 118, where the configuration is different than that of FIG. 2C. As shown, the supertile 106a processes two layers of the neural network, namely layers 1, and 2. Layer 1 is processed by analog PE 204a of compute-in-memory tile 108a, while layer 2 includes three sub-layers, namely layers 2.1, 2.2, and 2.3. As shown, layer 2.1 is processed by analog PE 204b of compute-in-memory tile 108b, layer 2.2 is processed by analog PE 204d of compute-in-memory tile 108d, and layer 2.3 is processed by analog PE 204c of compute-in-memory tile 108c. The analog router 104 may include connections 202a-c for transmitting analog output of compute-in-memory tiles 108a to compute-in-memory tiles 108b-d. Advantageously, FIGS. 2C-2D reflect the flexibility of supporting different neural network configurations 118, where the different supertiles 106 support one of a plurality of possible configurations to realize a larger neural network.

Figure 3:
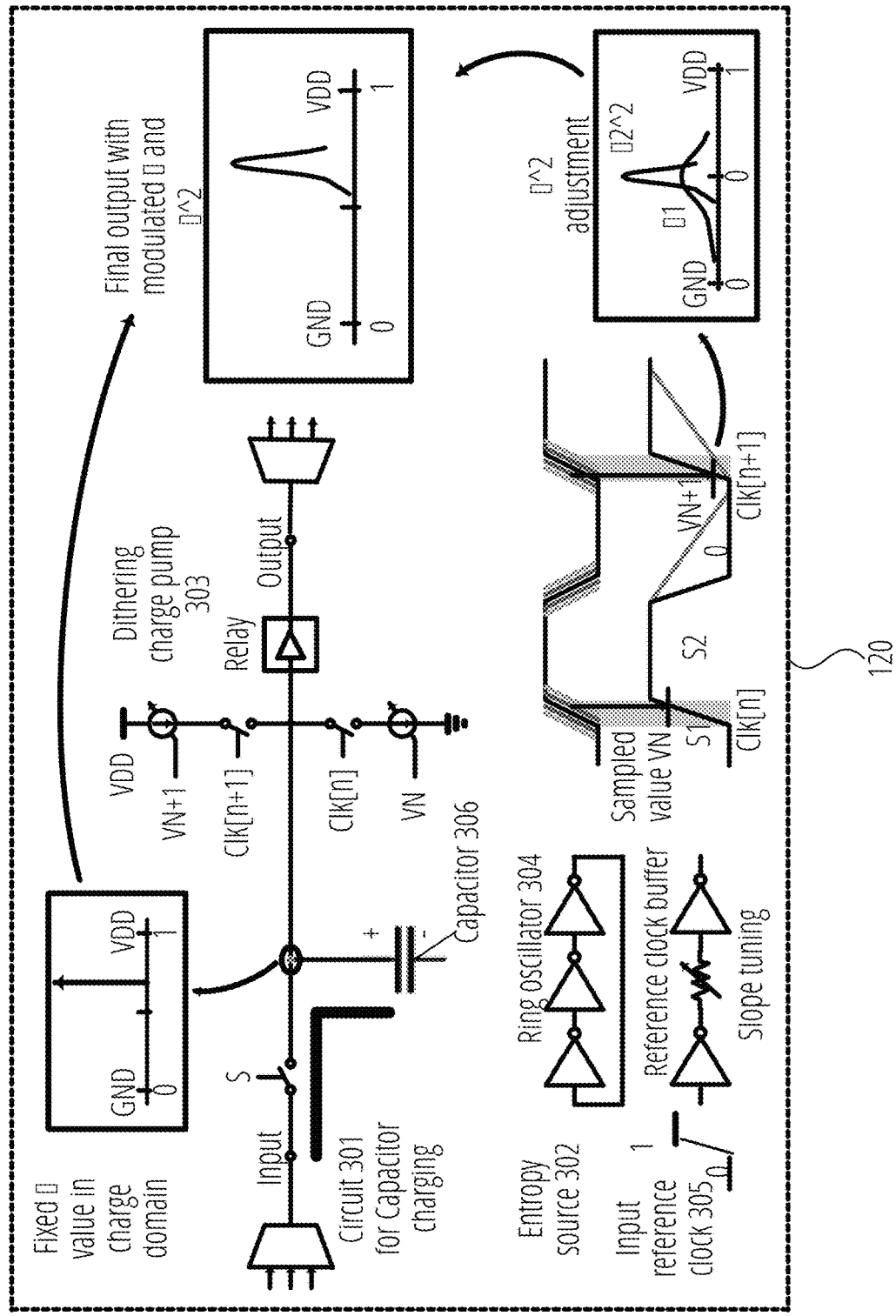
FIG. 3 illustrates an embodiment of a Gaussian distribution circuit.

FIG. 3 depicts an example configuration of the Gaussian logic 120, also referred to as a Gaussian distribution circuit, according to one embodiment. As stated, the generation of a Gaussian distribution is expensive to implement in digital hardware in terms of power, area on the NoC 102, and throughput. Analog signal transmission offers a less complex alternative option to introduce uncertainty into a static signal along with the data transmission for use in probabilistic computing by the neural network.

As shown, the Gaussian logic 120 includes a sample and hold circuit 301, an entropy source 302, a dithering charge pump 303, and a capacitor 306. The sample and hold circuit 301 tracks the output of the compute-in-memory tiles 108 and converts the signal into a charge (or voltage) stored on the positive plate of the capacitor 306. After charging the capacitor 306, the value on the node is the mean µ of the distribution. In one example, the charge (or voltage) stored on the positive plate may be the mean µ of the distribution. The entropy source 302 may comprise a ring oscillator 304, also referred to as a jittery oscillator. By using the jittery signal of the oscillator 304, to sample a relatively jitter-free reference clock 305 signal (e.g., a crystal oscillator) around its expected transition, the Gaussian distributed randomness in the time domain is transferred into the voltage domain by generating an output voltage in each cycle. The adjustment ability of the distribution variance $\sigma^2$ is obtained by tuning the slope of the reference clock 305. A steeper transition of the reference clock signal results in a wider sampling window and therefore leads to a large variation. Similarly, a flatter transition of the reference clock signal results in a narrower sampling window and leads towards a lesser variation.

The Gaussian logic 120 may then apply the distribution variance $\sigma^2$ onto the previously obtained amount of charge using a charge pump 303 modulated by the entropy source 302. The amount of charge at the node is modulated by the charge pump 303 in two adjacent clock cycles to discharge and recharge the value. The slope of the reference clock changes every two cycles based on the variance $\sigma^2$. In the first cycle, the output node is discharged with a current volume determined by the sampled voltage value $V_N$. In the second cycle, it is recharged by the volume controlled by the sampled voltage value $V_{N+1}$ at the second time step. The distribution variance $\sigma^2$ may then be determined as the difference between $V_N$ and $V_{N+1}$. By implementing this approach in the analog domain, the implementation of stochastic rounding operations is straightforward, e.g., by setting the variance $\sigma^2$ to the level of a single least significant bit (LSB).

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 4:
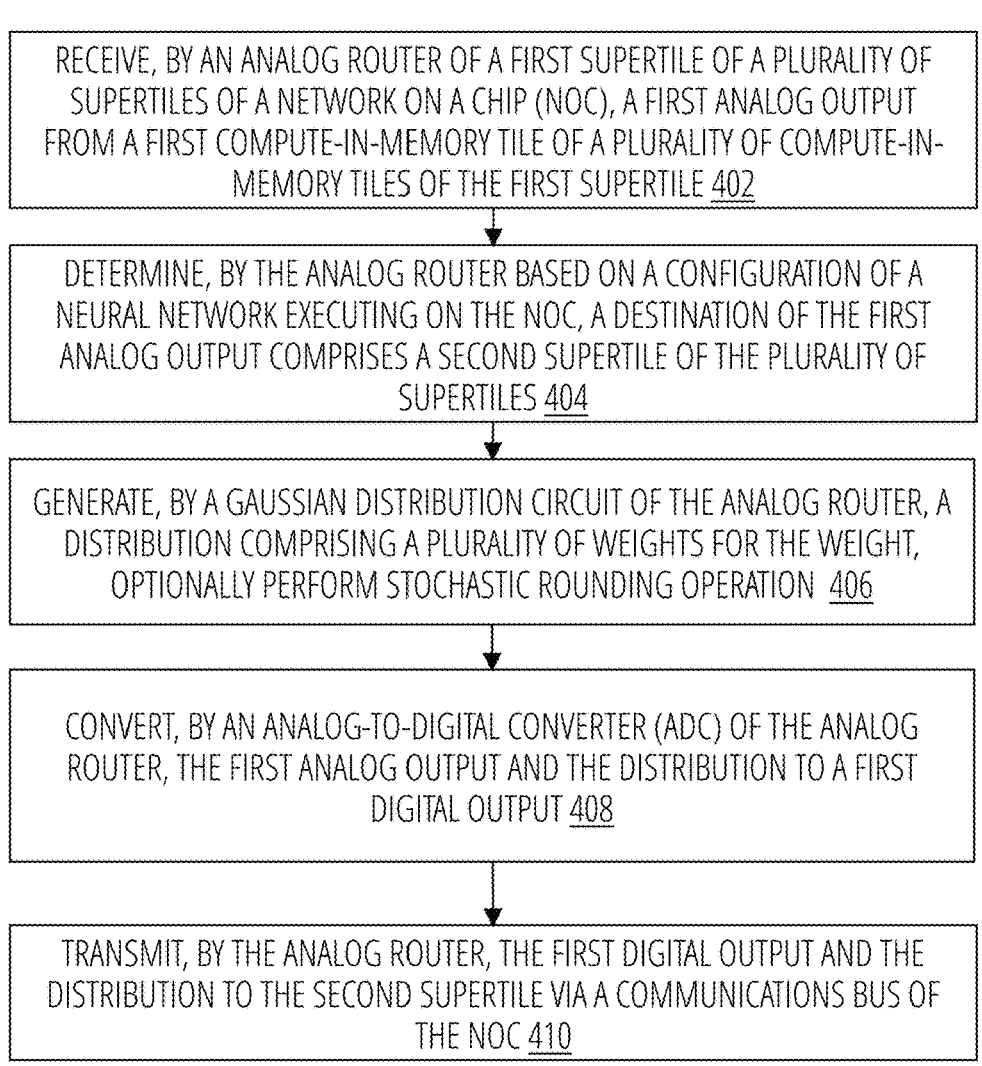
FIG. 4 illustrates an embodiment of a first logic flow.

FIG. 4 illustrates an embodiment of a logic flow, or routine, 400. The logic flow 400 may be representative of some or all of the operations executed by one or more embodiments described herein. For example, the logic flow 400 may include some or all of the operations to use an analog router to perform conversions of data between the analog domain and the digital domain in a network on a chip that implements a neural network using compute-in-memory logic. Embodiments are not limited in this context.

In block 402, routine 400 receives, by an analog router 104 of a first supertile 106a of a plurality of supertiles 106a-106n of a network on a chip (NoC) 102, a first analog output from a first compute-in-memory tile 108a of a plurality of compute-in-memory tiles 108a-108n of the first supertile 106. In block 404, routine 400 determines, by the analog router 104 based on a configuration of a neural network executing on the NoC, a destination of the first analog output comprises a second supertile 106b of the plurality of supertiles. In block 406, a Gaussian distribution circuit 120 of the analog router 104 generates a distribution comprising a plurality of weights for the weight of the neural network, and optionally performs a stochastic rounding operation. The weight may be included in the first analog output received at block 402. The weight may be for a node (or neuron) of the neural network, a layer of the neural network, or any other suitable component of the neural network. In block 408, an analog-to-digital converter (ADC) 124 of the analog router 104 converts the first analog output and the Gaussian distribution to a first digital output, e.g., one or more digital data packets. In block 410, the analog router 104 transmits the one or more packets including first digital output and the distribution to the second supertile via a communications bus 110 of the NoC 102. The bus 110 may include one or more digital routers 126 between the first and second supertiles that facilitate routing of the packets.

Figure 5:
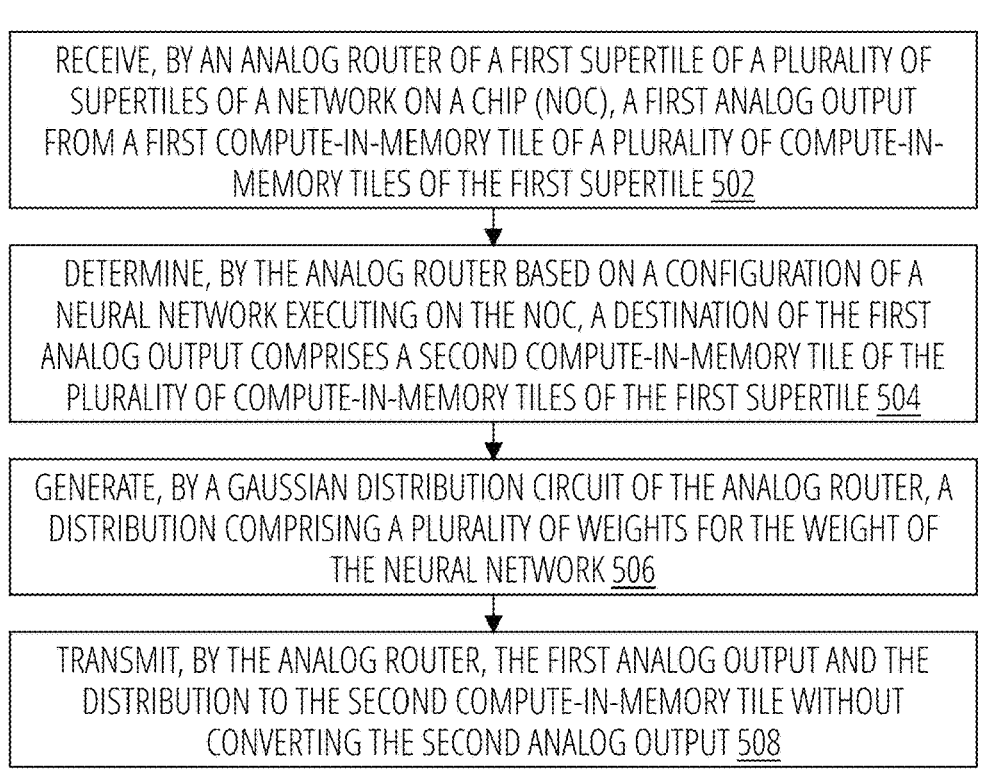
FIG. 5 illustrates an embodiment of a second logic flow.

FIG. 5 illustrates an embodiment of a logic flow, or routine, 500. The logic flow 500 may be representative of some or all of the operations executed by one or more embodiments described herein. For example, the logic flow 500 may include some or all of the operations to use an analog router to perform conversions of data between the analog domain and the digital domain in a network on a chip that implements a neural network using compute-in-memory logic. Embodiments are not limited in this context.

In block 502, routine 500 receives, by an analog router 104 of a first supertile 106a of a plurality of supertiles 106a-106n of a NoC 102, a first analog output from a first compute-in-memory tile 108a of a plurality of compute-in-memory tiles 108a-108n of the first supertile 106a. In block

504, routine 500 determines, by the analog router 104 based on a configuration of a neural network executing on the NoC, a destination of the first analog output comprises a second compute-in-memory tile 108b of the plurality of compute-in-memory tiles 108a-108n of the first supertile 106. In block 506, routine 500 generates, by a Gaussian distribution circuit 120 of the analog router 104, a distribution comprising a plurality of weights for the weight of the neural network. The weight may be included in the first analog output received at block 502. The weight may be for a node (or neuron) of the neural network, a layer of the neural network, or any other suitable component of the neural network. In block 508, routine 500 transmits, by the analog router, the first analog output and the distribution to the second compute-in-memory tile without converting the second analog output to the digital domain. Advantageously, doing so reduces the amount of energy used by the NoC 102, as the NoC 102 need not convert the analog output and the distribution from the analog domain to the digital domain, and vice versa.

Figure 6:
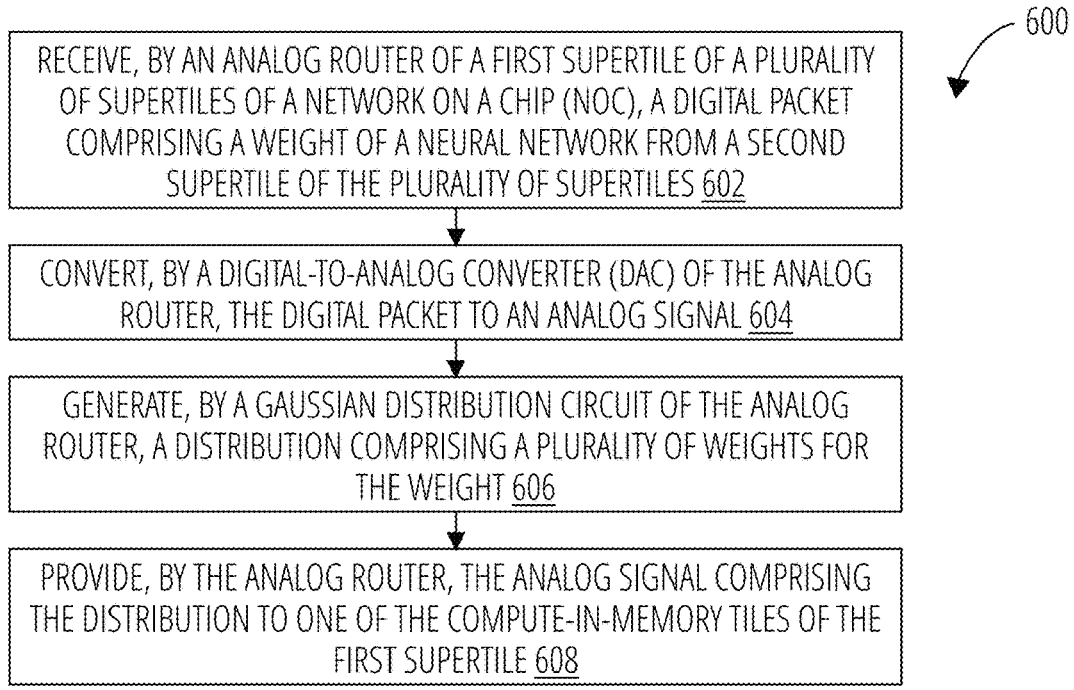
FIG. 6 illustrates an embodiment of a third logic flow.

FIG. 6 illustrates an embodiment of a logic flow, or routine, 600. The logic flow 600 may be representative of some or all of the operations executed by one or more embodiments described herein. For example, the logic flow 600 may include some or all of the operations to use an analog router to perform conversions of data between the analog domain and the digital domain in a network on a chip that implements a neural network using compute-in-memory logic. Embodiments are not limited in this context.

In block 602, routine 600 receives, by an analog router 104 of a first supertile 106a of a plurality of supertiles 106a-106n of a NoC 102, a digital packet comprising a weight of a neural network from a second supertile 106b of the plurality of supertiles 106a-106n. The packet may be received via the bus 110 and one or more digital routers 126 between the supertiles 106a and 106b. In block 604, routine 600 converts, by a digital-to-analog converter (DAC) 122 of the analog router 104 of the first supertile 106a, the digital packet to an analog signal. In block 606, routine 600 generates, by a Gaussian distribution circuit 120 of the analog router 104, a distribution comprising a plurality of weights for the weight. In block 608, routine 600 provides, by the analog router, the analog signal and the distribution to one of a plurality of compute-in-memory tiles 108a-108n of the first supertile 106a.

Figure 7:
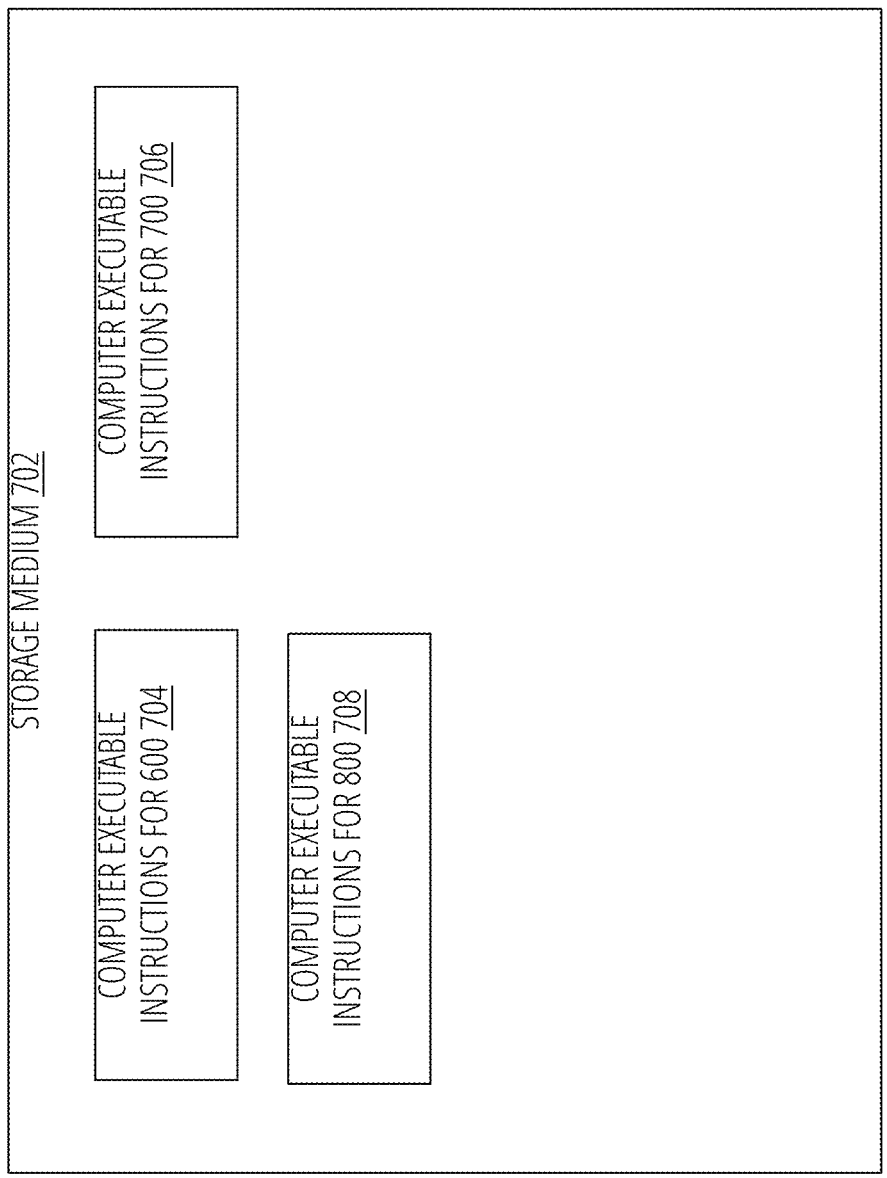
FIG. 7 illustrates an example of a storage medium.

FIG. 7 illustrates an embodiment of a storage medium 702. Storage medium 702 may comprise any non-transitory computer-readable storage medium or machine-readable storage medium, such as an optical, magnetic or semiconductor storage medium. In various embodiments, storage medium 702 may comprise an article of manufacture. In some embodiments, storage medium 702 may store computer-executable instructions, such as computer-executable instructions to implement one or more of logic flows or operations described herein, such as computer-executable instructions 704 for logic flow 400 of FIG. 4, computer-executable instructions 704 for logic flow 500 of FIG. 5, and computer-executable instructions 706 for logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
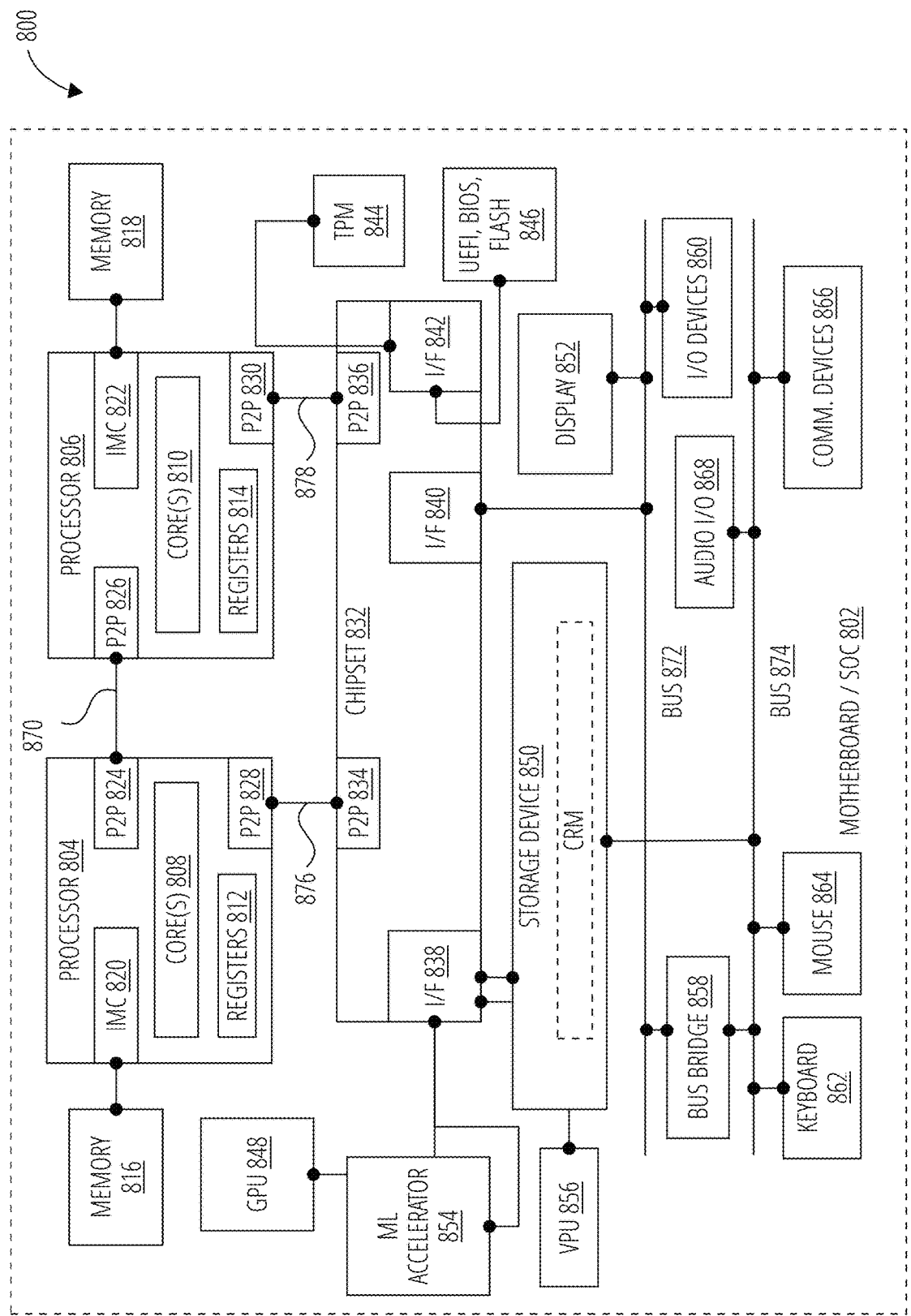
FIG. 8 illustrates an example computing system.

FIG. 8 illustrates an embodiment of a system 800. System 800 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores. In at least one embodiment, the computing system 800 is representative of the network on a chip 102 of the system 100. More generally, the computing system 800 is configured to implement all logic, systems, logic flows, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard or system-on-chip (SoC) 802 for mounting platform components. The motherboard or system-on-chip (SoC) 802 may be representative of the NoC 102 of FIG. 1. Motherboard or system-on-chip (SoC) 802 is a point-to-point (P2P) interconnect platform that includes a first processor 804 and a second processor 806 coupled via a point-to-point interconnect 870 such as an Ultra Path Interconnect (UPI). In other embodiments, the system 800 may be of another bus architecture, such as a multi-drop bus. Furthermore, each of processor 804 and processor 806 may be processor packages with multiple processor cores including core(s) 808 and core(s) 810, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 804 and chipset 832. Some platforms may include additional components and some platforms may only include sockets to mount the processors and/or the chipset. Furthermore, some platforms may not have sockets (e.g. SoC, or the like).

The processor 804 and processor 806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 804 and/or processor 806. Additionally, the processor 804 need not be identical to processor 806.

Processor 804 includes an integrated memory controller (IMC) 820 and point-to-point (P2P) interface 824 and P2P interface 828. Similarly, the processor 806 includes an IMC 822 as well as P2P interface 826 and P2P interface 830. IMC 820 and IMC 822 couple the processors processor 804 and processor 806, respectively, to respective memories (e.g., memory 816 and memory 818). Memory 816 and memory 818 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 816 and memory 818 locally attach to the respective processors (i.e., processor 804 and processor 806). In other embodiments, the main memory may couple with the processors via a bus and shared memory hub.

System 800 includes chipset 832 coupled to processor 804 and processor 806. Furthermore, chipset 832 can be coupled to storage device 850, for example, via an interface (I/F) 838. The I/F 838 may be, for example, a Peripheral Component Interconnect-enhanced (PCI-e). Storage device 850 can store instructions executable by circuitry of system 800 (e.g., processor 804, processor 806, GPU 848, ML accelerator 854, vision processing unit 856, or the like).

Processor 804 couples to a chipset 832 via P2P interface 828 and P2P 834 while processor 806 couples to a chipset 832 via P2P interface 830 and P2P 836. Direct media interface (DMI) 876 and DMI 878 may couple the P2P interface 828 and the P2P 834 and the P2P interface 830 and P2P 836, respectively. DMI 876 and DMI 878 may be a high-speed interconnect that facilitates, e.g., eight Giga Transfers per second (GT/s) such as DMI 3.0. In other embodiments, the processor 804 and processor 806 may interconnect via a bus.

The chipset 832 may comprise a controller hub such as a platform controller hub (PCH). The chipset 832 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 832 may comprise more than one controller hub such as a chipset with a memory controller hub, a graphics controller hub, and an input/output (I/O) controller hub.

In the depicted example, chipset 832 couples with a trusted platform module (TPM) 844 and UEFI, BIOS, FLASH circuitry 846 via I/F 842. The TPM 844 is a dedicated microcontroller designed to secure hardware by integrating cryptographic keys into devices. The UEFI, BIOS, FLASH circuitry 846 may provide pre-boot code.

Furthermore, chipset 832 includes the I/F 838 to couple chipset 832 with a high-performance graphics engine, such as, graphics processing circuitry or a graphics processing unit (GPU) 848. In other embodiments, the system 800 may include a flexible display interface (FDI) (not shown) between the processor 804 and/or the processor 806 and the chipset 832. The FDI interconnects a graphics processor core in one or more of processor 804 and/or processor 806 with the chipset 832.

Additionally, ML accelerator 854 and/or vision processing unit 856 can be coupled to chipset 832 via I/F 838. ML accelerator 854 can be circuitry arranged to execute ML related operations (e.g., training, inference, etc.) for ML models. Likewise, vision processing unit 856 can be circuitry arranged to execute vision processing specific or related operations. In particular, ML accelerator 854 and/or vision processing unit 856 can be arranged to execute mathematical operations and/or operands useful for machine learning, neural network processing, artificial intelligence, vision processing, etc.

Various I/O devices 860 and display 852 couple to the bus 872, along with a bus bridge 858 which couples the bus 872 to a second bus 874 and an I/F 840 that connects the bus 872 with the chipset 832. In one embodiment, the second bus 874 may be a low pin count (LPC) bus. Various devices may couple to the second bus 874 including, for example, a keyboard 862, a mouse 864 and communication devices 866.

Furthermore, an audio I/O 868 may couple to second bus 874. Many of the I/O devices 860 and communication devices 866 may reside on the motherboard or system-on-chip (SoC) 802 while the keyboard 862 and the mouse 864 may be add-on peripherals. In other embodiments, some or all the I/O devices 860 and communication devices 866 are add-on peripherals and do not reside on the motherboard or system-on-chip (SoC) 802.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

The following examples pertain to further embodiments, from which numerous permutations and configurations will be apparent.

Example 1 is a method, comprising: receiving, by an analog router of a first supertile of a plurality of supertiles of a network on a chip (NoC), a first analog output from a first compute-in-memory tile of a plurality of compute-in-memory tiles of the first supertile; determining, by the analog router based on a configuration of a neural network executing on the NoC, that a destination of the first analog output comprises a second supertile of the plurality of supertiles; converting, by an analog-to-digital converter (ADC) of the analog router, the first analog output to a first digital output; and transmitting, by the analog router, the first digital output to the second supertile via a communications bus of the NoC.

Example 2 includes the subject matter of example 1, wherein the first analog output comprises a weight of the neural network, further comprising: generating, by a Gaussian distribution circuit of the analog router, a Gaussian distribution comprising a mean and a variance of the weight; and transmitting, by the analog router to the second supertile, the distribution and the first digital output via at least one digital router of a plurality of digital routers of the communications bus.

Example 3 includes the subject matter of example 2, further comprising: performing, by the Gaussian distribution circuit, a stochastic rounding operation on the weight.

Example 4 includes the subject matter of example 1, further comprising: receiving, by the analog router, a second analog output of the first compute-in-memory tile; determining, by the analog router, that a destination of the second analog output comprises a second compute-in-memory tile of the plurality of compute-in-memory tiles of the first supertile; and transmitting, by the analog router, the second analog output to the second compute-in-memory tile without converting the second analog output.

Example 5 includes the subject matter of example 4, wherein the output comprises a weight of the neural network, further comprising: generating, by a Gaussian distribution circuit of the analog router, a Gaussian distribution comprising a plurality of weights for the weight; and transmitting, by the analog router to the second compute-in-memory tile, the distribution and the second analog output.

Example 6 includes the subject matter of example 1, further comprising: receiving, by the analog router via a digital router of the communications bus, a digital packet from the second supertile; converting, by a digital-to-analog converter (DAC) of the analog router, the digital packet to an analog signal; and providing, by the analog router, the analog signal to one of the compute-in-memory tiles of the first supertile.

Example 7 includes the subject matter of example 1, wherein each compute-in-memory tile comprises a respective processing circuitry and a respective memory, wherein each supertile comprises a respective analog router and a respective plurality of compute-in-memory tiles, the method further comprising: packetizing, by the analog router, the first digital output to one or more packets prior to transmitting the first digital output to the second supertile.

Example is 8 an apparatus for a network on a chip (NoC), comprising: a plurality of supertiles, each supertile comprising an analog router and a plurality of compute-in-memory tiles; and logic, at least a portion of which is implemented in the analog router of a first supertile of the plurality of supertiles, the logic to: receive a first analog output from a first compute-in-memory tile of a plurality of compute-in-memory tiles of the first supertile; determine, based on a configuration of a neural network executing on the NoC, that a destination of the first analog output comprises a second supertile of the plurality of supertiles; convert, by an analog-to-digital converter (ADC) of the analog router, the first analog output to a first digital output; and transmit, by the analog router, the first digital output to the second supertile via a communications bus of the NoC.

Example 9 includes the subject matter of example 8, wherein the first analog output comprises a weight of the neural network, wherein the logic is further configured to: generate, by a Gaussian distribution circuit of the analog router, a Gaussian distribution comprising a plurality of weights for the weight; and transmit the distribution and the first digital output to the second supertile via at least one digital router of a plurality of digital routers of the NoC.

Example 10 includes the subject matter of example 9, wherein the logic is further configured to: perform, by the Gaussian distribution circuit, a stochastic rounding operation on the weight.

Example 11 includes the subject matter of example 8, wherein the logic is further configured to: receive, by the analog router, a second analog output of the first compute-in-memory tile; determine, by the analog router, that a destination of the second analog output comprises a second compute-in-memory tile of the plurality of compute-in-memory tiles of the first supertile; and transmit, by the analog router, the second analog output to the second compute-in-memory tile without converting the second analog output.

Example 12 includes the subject matter of example 11, wherein the output comprises a weight of the neural network, wherein the logic is further configured to: generate, by a Gaussian distribution circuit of the analog router, a Gaussian distribution comprising a plurality of weights for the weight; and transmit, by the analog router to the second compute-in-memory tile, the distribution and the second analog output.

Example 13 includes the subject matter of example 8, wherein the logic is further configured to: receive, by the analog router via a digital router of the communications bus, a digital packet from the second supertile; convert, by a digital-to-analog converter (DAC) of the analog router, the digital packet to an analog signal; and provide, by the analog router, the analog signal to one of the compute-in-memory tiles of the first supertile.

Example 14 includes the subject matter of example 8, wherein each compute-in-memory tile comprises a respective processing circuitry and a respective memory, wherein each supertile comprises a respective analog router and a respective plurality of compute-in-memory tiles, wherein the logic is further configured to: packetize the first digital output to one or more packets prior to transmitting the first digital output to the second supertile.

Example 15 is a non-transitory computer-readable storage medium, the computer-readable storage medium including instructions that when executed by a network on a chip, cause the NoC to: receive, by an analog router of a first supertile of a plurality of supertiles of the NoC, a first analog output from a first compute-in-memory tile of a plurality of compute-in-memory tiles of the first supertile; determine, by the analog router based on a configuration of a neural network executing on the NoC, that a destination of the first analog output comprises a second supertile of the plurality of supertiles; convert, by an analog-to-digital converter (ADC) of the analog router, the first analog output to a first digital output; and transmit, by the analog router, the first digital output to the second supertile via a communications bus of the NoC.

Example 16 includes the subject matter of example 15, wherein the first analog output comprises a weight of the neural network, wherein the instructions further configure the computer to: generate, by a Gaussian distribution circuit of the analog router, a Gaussian distribution comprising a plurality of weights for the weight; and transmit, by the analog router to the second supertile, the distribution and the first digital output via at least one digital router of a plurality of digital routers of the communications bus.

Example 17 includes the subject matter of example 16, wherein the instructions further configure the NoC to: perform, by the Gaussian distribution circuit, a stochastic rounding operation on the weight. 18 includes the subject matter of example 15, wherein the instructions further configure the NoC to: receive, by the analog router, a second analog output of the first compute-in-memory tile; determine, by the analog router, that a destination of the second analog output comprises a second compute-in-memory tile of the plurality of compute-in-memory tiles of the first supertile; and transmit, by the analog router, the second analog output to the second compute-in-memory tile without converting the second analog output.

Example 19 includes the subject matter of example 18, wherein the output comprises a weight of the neural network, wherein the instructions further configure the NoC to: generate, by a Gaussian distribution circuit of the analog router, a Gaussian distribution comprising a plurality of weights for the weight; and transmit, by the analog router to the second compute-in-memory tile, the distribution and the second analog output via at least one digital router of a plurality of digital routers of the NoC.

Example 20 includes the subject matter of example 15, wherein each compute-in-memory tile comprises a respective processing circuitry and a respective memory, wherein each supertile comprises a respective analog router and a respective plurality of compute-in-memory tiles, wherein the instructions further configure the NoC to: receive, by the analog router via a digital router of the communications bus, a digital packet from the second supertile; convert, by a digital-to-analog converter (DAC) of the analog router, the digital packet to an analog signal; and provide, by the analog router, the analog signal to one of the compute-in-memory tiles of the first supertile.

Example 21 is an apparatus, comprising: means for receiving, by an analog router of a first supertile of a plurality of supertiles of a network on a chip (NoC), a first analog output from a first compute-in-memory tile of a plurality of compute-in-memory tiles of the first supertile; means for determining, by the analog router based on a configuration of a neural network executing on the NoC, that a destination of the first analog output comprises a second supertile of the plurality of supertiles; means for converting, by an analog-to-digital converter (ADC) of the analog router, the first analog output to a first digital output; and means for transmitting, by the analog router, the first digital output to the second supertile via a communications bus of the NoC.

Example 22 includes the subject matter of example 21, wherein the first analog output comprises a weight of the neural network, further comprising: means for generating, by a Gaussian distribution circuit of the analog router, a Gaussian distribution comprising a plurality of weights for the weight; and means for transmitting, by the analog router to the second supertile, the distribution and the first digital output via at least one digital router of a plurality of digital routers of the communications bus.

Example 23 includes the subject matter of example 22, further comprising: means for performing, by the Gaussian distribution circuit, a stochastic rounding operation on the weight.

Example 24 includes the subject matter of example 21, further comprising: means for receiving, by the analog router, a second analog output of the first compute-in-memory tile; means for determining, by the analog router, that a destination of the second analog output comprises a second compute-in-memory tile of the plurality of compute-in-memory tiles of the first supertile; and means for transmitting, by the analog router, the second analog output to the second compute-in-memory tile without converting the second analog output.

Example 25 includes the subject matter of example 24, wherein the output comprises a weight of the neural network, further comprising: means for generating, by a Gaussian distribution circuit of the analog router, a Gaussian distribution comprising a plurality of weights for the weight; and means for transmitting, by the analog router to the second compute-in-memory tile, the distribution and the second analog output.

Example 26 includes the subject matter of example 21, further comprising: means for receiving, by the analog router via a digital router of the communications bus, a digital packet from the second supertile; means for converting, by a digital-to-analog converter (DAC) of the analog router, the digital packet to an analog signal; and means for providing, by the analog router, the analog signal to one of the compute-in-memory tiles of the first supertile.

Example 27 includes the subject matter of example 21, wherein each compute-in-memory tile comprises a respective processing circuitry and a respective memory, wherein each supertile comprises a respective analog router and a respective plurality of compute-in-memory tiles, the apparatus further comprising: means for packetizing, by the analog router, the first digital output to one or more packets prior to transmitting the first digital output to the second supertile.

In addition, in the foregoing, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An apparatus for a network on a chip (NoC), the apparatus comprising:
a plurality of supertiles, each supertile including an analog router and a plurality of compute-in-memory tiles; and
logic circuitry, at least a portion of which is implemented in a first analog router of a first supertile of the plurality of supertiles, the logic circuitry to:
receive a first analog output from a first compute-in-memory tile of a first plurality of compute-in-memory tiles of the first supertile, the first analog output representing a weight of a neural network to be executed on the NoC;
determine, based on a configuration of the neural network, that a destination of the first analog output identifies a second supertile of the plurality of supertiles;
generate, by a Gaussian distribution circuit of the analog router, a Gaussian distribution for the weight:
convert, by an analog-to-digital converter (ADC) of the analog router, the first analog output to a first digital output; and
transmit, by the analog router, the first digital output including the Gaussian distribution to the second supertile via at least one digital router of a communications bus of the NoC, the communications bus including a plurality of digital routers.

2. The apparatus of claim 1, wherein the logic circuitry is to perform, by the Gaussian distribution circuit, a stochastic rounding operation on the weight.

3. The apparatus of claim 1, wherein the destination is a first destination, and the logic circuitry is to:
receive, by the analog router, a second analog output of the first compute-in-memory tile;
determine, by the analog router, that a second destination of the second analog output identifies a second compute-in-memory tile of the first plurality of compute-in-memory tiles of the first supertile; and
transmit, by the analog router, the second analog output to the second compute-in-memory tile.

4. The apparatus of claim 3, wherein the weight is a first weight, the second analog output represents a second weight of the neural network, the Gaussian distribution is a first Gaussian distribution, and the logic circuitry is to:
generate, by the Gaussian distribution circuit of the analog router, a second Gaussian distribution for the second weight; and
transmit, by the analog router to the second compute-in-memory tile, the second Gaussian distribution and the second analog output.

5. An apparatus for a network on a chip (NoC), the apparatus comprising:
a plurality of supertiles, each supertile including an analog router and a plurality of compute-in-memory tiles; and
logic circuitry, at least a portion of which is implemented in a first analog router of a first supertile of the plurality of supertiles, the logic circuitry to:
receive a first analog output from a first compute-in-memory tile of a first plurality of compute-in-memory tiles of the first supertile;
determine, based on a configuration of a neural network to be executed on the NoC, that a destination of the first analog output identifies a second supertile of the plurality of supertiles;
convert, by an analog-to-digital converter (ADC) of the analog router, the first analog output to a first digital output;
transmit, by the analog router, the first digital output to the second supertile via a communications bus of the NoC;
receive, by the analog router via a digital router of the communications bus, a digital packet from the second supertile;
convert, by a digital-to-analog converter (DAC) of the analog router, the digital packet to an analog signal; and
provide, by the analog router, the analog signal to one of the first plurality of compute-in-memory tiles of the first supertile.

6. The apparatus of claim 1, wherein each of the plurality of compute-in-memory tiles includes processor circuitry and a memory, and the logic circuitry is to packetize the first digital output into one or more packets prior to transmission of the first digital output to the second supertile.

7. A non-transitory computer-readable storage medium comprising instructions that cause a network on a chip (NoC) to:
receive, by an analog router of a first supertile of a plurality of supertiles of the NoC, a first analog output from a first compute-in-memory tile of a plurality of compute-in-memory tiles of the first supertile, the first analog output including a weight of a neural network to be executed on the NoC;
determine, by the analog router and based on a configuration of the neural network, that a destination of the first analog output identifies a second supertile of the plurality of supertiles;
convert, by an analog-to-digital converter (ADC) of the analog router, the first analog output to a first digital output;
transmit, by the analog router, the first digital output to the second supertile via a communications bus of the NoC;
receive, by the analog router via a digital router of the communications bus, a digital packet from the second supertile;
convert, by a digital-to-analog converter (DAC) of the analog router, the digital packet to an analog signal; and
provide, by the analog router, the analog signal to one of the plurality of compute-in- memory tiles of the first supertile.

8. The non-transitory computer-readable storage medium of claim 7, wherein the instructions cause the NoC to:
generate, by a Gaussian distribution circuit of the analog router, a Gaussian distribution for the weight; and
transmit, by the analog router, the first digital output to the second supertile via at least one digital router of a plurality of digital routers of the communications bus, the first digital output including the Gaussian distribution.

9. The non-transitory computer-readable storage medium of claim 8, wherein the instructions cause the NoC to perform, by the Gaussian distribution circuit, a stochastic rounding operation on the weight.

10. The non-transitory computer-readable storage medium of claim 7, wherein the destination is a first destination, and the instructions cause the NoC to:
receive, by the analog router, a second analog output of the first compute-in-memory tile;
determine, by the analog router, that a second destination of the second analog output identifies a second compute-in-memory tile of the plurality of compute-in-memory tiles of the first supertile; and
transmit, by the analog router, the second analog output to the second compute-in-memory tile.

11. The non-transitory computer-readable storage medium of claim 10, wherein the instructions cause the NoC to:
generate, by a Gaussian distribution circuit of the analog router, a Gaussian distribution for the weight; and
transmit, by the analog router to the second compute-in-memory tile, the Gaussian distribution and the second analog output via at least one digital router of a plurality of digital routers of the NoC.

12. The non-transitory computer-readable storage medium of claim 7, wherein each of the plurality of compute-in-memory tiles includes processor circuitry and a memory, and the instructions cause the NoC to packetize the first digital output into one or more packets prior to transmission of the first digital output to the second supertile.

13. An apparatus comprising:
means for routing to:
receive a first analog output from a first compute-in-memory tile of a plurality of compute-in-memory tiles of a first supertile of a plurality of supertiles of a network on a chip (NoC), the first analog output to represent a weight of a neural network to be executed on the NoC;
determine, based on a configuration of the neural network, that a destination of the first analog output identifies a second supertile of the plurality of supertiles;
transmit a first digital output to the second supertile via a communications bus of the NoC:
receive, from a digital router of the communications bus, a digital packet from the second supertile; and
provide an analog signal to one of the plurality of compute-in-memory tiles of the first supertile;
means for converting the first analog output to the first digital output; and
means for converting the digital packet to the analog signal.

14. The apparatus of claim 13, wherein the apparatus further includes including means for generating a Gaussian distribution for the weight, and the means for routing is to transmit the first digital output to the second supertile via at least one digital router of a plurality of digital routers of the communications bus, the first digital output including the Gaussian distribution.

15. The apparatus of claim 14, further including means for performing a stochastic rounding operation on the weight.

16. The apparatus of claim 13, wherein the destination is a first destination, and the means for routing is to:
receive a second analog output of the first compute-in-memory tile;
determine that a second destination of the second analog output identifies a second compute-in-memory tile of the plurality of compute-in-memory tiles of the first supertile; and
transmit the second analog output to the second compute-in-memory tile.

17. The apparatus of claim 16, wherein the apparatus further includes means for generating a Gaussian distribution for the weight, and the means for routing is to transmit the Gaussian distribution and the second analog output to the second compute-in-memory tile.

* * * * *